(12) United States Patent
Kosaka et al.

(10) Patent No.: US 9,584,054 B2
(45) Date of Patent: Feb. 28, 2017

(54) OUTPUT CONTROL DEVICE, METHOD AND PROGRAM FOR WIND FARM

(71) Applicant: Kabushiki Kaisha Toshiba, Minato-ku (JP)

(72) Inventors: Yoko Kosaka, Nakano-ku (JP); Kenichi Tanomura, Fuchu (JP); Katsutoshi Hiromasa, Fuchu (JP); Yoichi Tone, Suginami-ku (JP); Toshimasa Yamada, Yokohama (JP); Kiyoshi Kusunoki, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 687 days.

(21) Appl. No.: 14/050,689

(22) Filed: Oct. 10, 2013

(65) Prior Publication Data

US 2014/0103654 A1 Apr. 17, 2014

(30) Foreign Application Priority Data

Oct. 16, 2012 (JP) ................................ 2012-229046

(51) Int. Cl.
*H02P 9/00* (2006.01)
*F03D 7/02* (2006.01)
*F03D 7/04* (2006.01)

(52) U.S. Cl.
CPC .............. *H02P 9/00* (2013.01); *F03D 7/028* (2013.01); *F03D 7/048* (2013.01);
(Continued)

(58) Field of Classification Search
CPC ............. H02P 9/00; F03D 7/028; F03D 7/048
(Continued)

(56) References Cited

U.S. PATENT DOCUMENTS 6,768,277 B2   7/2004 Ichinose et al.
7,425,771 B2   9/2008 Rivas et al.
(Continued)

FOREIGN PATENT DOCUMENTS

JP   54-76704 A    6/1979
JP   2003-23733 A  1/2003
(Continued)

OTHER PUBLICATIONS

Tohoku-Electric Power Co., Inc. "System Connection Technology Requirement of Wind Power Generation Facilities (for extremely high voltage)", Dec. 2011, 69 pages ( with English Abstract).
(Continued)

*Primary Examiner* — Joseph Chang
(74) *Attorney, Agent, or Firm* — Oblon, McClelland, Maier & Neustadt, L.L.P.

(57) ABSTRACT

A wind farm output control device includes a potential estimator estimating a maximum electrical energy outputtable by each wind power generation device, a control amount determiner determining, based on the estimated maximum power amount, a control amount for an effective power of each wind power generation device and/or a reactive power thereof in a wind farm, and a control amount distributor distributing the control amount based on an available power generation amount of each wind power generation device. The potential estimator estimates the maximum power amount based on a pitch angle of blades, an angular speed deviation of a power generator, and a conversion loss of the wind power generation device. Within the range of the estimated maximum power amount, the control amount for the output by the wind farm is distributed within a range where each wind power generation device is outputtable according to the wind condition.

9 Claims, 13 Drawing Sheets

(52) U.S. Cl.
CPC ..... *F05B 2260/821* (2013.01); *F05B 2270/32* (2013.01); *F05B 2270/328* (2013.01); *F05B 2270/335* (2013.01); *Y02E 10/723* (2013.01)

(58) Field of Classification Search
USPC .............................................. 307/43; 290/44
See application file for complete search history.

(56) References Cited

U.S. PATENT DOCUMENTS

| | | | |
|---|---|---|---|
| 7,952,214 | B2 | 5/2011 | Ichinose et al. |
| 8,183,704 | B2 | 5/2012 | Rivas et al. |
| 8,207,623 | B2 | 6/2012 | Rivas et al. |
| 8,294,288 | B2 | 10/2012 | Rivas et al. |
| 8,301,313 | B2 | 10/2012 | Wobben |
| 8,355,824 | B2 | 1/2013 | Yasugi |
| 2003/0020419 | A1 | 1/2003 | Ichinose et al. |
| 2007/0216164 | A1 | 9/2007 | Rivas et al. |
| 2008/0296898 | A1 | 12/2008 | Ichinose et al. |
| 2009/0167095 | A1 | 7/2009 | Rivas et al. |
| 2009/0278352 | A1 | 11/2009 | Rivas et al. |
| 2010/0312409 | A1 | 12/2010 | Zeumer et al. |
| 2011/0057443 | A1 | 3/2011 | Rivas et al. |
| 2011/0074152 | A1 | 3/2011 | Yasugi |
| 2012/0010756 | A1 | 1/2012 | Larsen et al. |
| 2012/0181879 | A1 | 7/2012 | Andresen et al. |
| 2013/0038061 | A1 | 2/2013 | Rivas et al. |

FOREIGN PATENT DOCUMENTS

| | | |
|---|---|---|
| JP | 2003-47295 A | 2/2003 |
| JP | 2007-32488 | 2/2007 |
| JP | 2007-37226 | 2/2007 |
| JP | 2008-301584 A | 12/2008 |
| JP | 2009-531011 | 8/2009 |
| JP | 2009-239990 | 10/2009 |
| JP | 4881349 | 12/2011 |
| WO | WO 2010/134171 A1 | 11/2010 |

OTHER PUBLICATIONS

"Wind power plant controller" (Wind Turbines—Part 25-2: Communications for monitoring and control of wind power plants—information models), Annex C (informative), 61400-25-2 IEC:2006(E), Dec. 14, 2006, 6 pages.

Office Action issued May 17, 2016 in Japanese Patent Application No. 2012-229046.

OUTPUT CONTROL DEVICE, METHOD AND PROGRAM FOR WIND FARM

CROSS-REFERENCE TO RELATED APPLICATION(S)

This application is based upon and claims the benefit of priority from Japan Patent Application No. 2012-229046, filed on Oct. 16, 2012, the entire contents of which are incorporated herein by reference.

TECHNICAL FIELD

The disclosure of this application relates to an output control device, a method and a program for a wind farm.

BACKGROUND

In view of the depletion of fossil fuels and the prevention of a global warming, introduction of power generation systems utilizing natural energy (e.g., wind power and solar power) is advancing worldwide. A wind power generation device converts energy possessed by wind into rotation energy through a wind turbine, and transmits such energy to a power generator directly or with an increase in the rotation speed by a speed-up gear, thereby generating electrical energy. A wind farm is a system for generating large power by placing wind power generation devices of several tens to a hundred or more on a broad land or on the broad ocean.

When the scale increases, a wind farm affects a stable operation of a power system, and thus an output control performance and a system interconnection management equivalent to those of a thermal power generation plant are required. System interconnection requirements to interconnect a wind farm with a commercial system are defined by respective electric power companies and national standards which are disclosed in, for example, "System Connection Technology Requirement of Wind Power Generation Facilities (for extremely high voltage)", Dec., 2011, Tohoku-Electric Power Co., Inc.; and Standard Number IEC61400-25-2 (Wind Turbines-Part 25-2: Communications for monitoring and control of wind power plants-Information models) Annex C, 2006-12-14.

In a power system, a thermal power generation device or a water power generation device controls respective frequencies within a certain range, and when a wind farm that changes the frequency in accordance with wind is interconnected with the power system, the load of frequency control increases. During a night at which the thermal power generation devices and the water power generation devices in the power system are deactivated, the frequency maintaining performance decreases, and thus it may be necessary in some cases to parallel off the wind farm.

The fluctuation originating from the wind farm also causes a voltage fluctuation at a connection point, which deteriorates the power quality. The above standard IEC61400-25-2 also defines a spinning reserve to be held, i.e., a performance that can increase supplied power to a system when a disturbance like a breakdown occurs in an interconnected power system. By maintaining the spinning reserve, the wind farm can be operated as a power plant that can contribute to the system stabilization.

For a power producer possessing a wind farm, it becomes possible to increase the operating rate while avoiding unnecessary parallel off, and further to contribute to the system stabilization when a breakdown of a power system occurs by controlling the wind farm output so as to satisfy the system interconnection requirement. Hence, JP 2009-239990 A, JP 2007-32488 A, and JP 2007-37226 A disclose wind farm control technologies, but those control technologies are not made in consideration of maintaining a spinning reserve. Moreover, Japan Patent No. 4881349 discloses a wind-farm-output control technology of adjusting the output by a wind farm so as to maintain a reserved power.

There are needs for power producers to not only maintain a spinning reserve while satisfying a system interconnection requirement, but also stabilize the yieldability by maximally utilizing wind energy to perform an efficient operation. The wind farm operation technology of Japan Patent No. 4881349 enables an operation of a wind farm that maintains a reserved power while satisfying a system interconnection requirement. However, Japan Patent No. 4881349 does not explicitly describe a specific way to realize the distribution method of the outputs of respective wind power generation devices. Therefore, it cannot be always said that the efficiency of the method of Japan Patent No. 4881349 is the best. Moreover, when the frequency increases, a wind farm output can be reduced and suppressed, but when the frequency decreases, it is difficult to increase the output.

SUMMARY

The disclosure of the present application has been made in order to address the above-explained technical disadvantages, and it is an objective to provide an output control device, a method and a program for a wind farm which estimate energy obtainable from wind, and which can automatically and efficiently distribute a control amount in accordance with the condition of the wind within an outputtable generation power range of each wind power generation device.

An output control device for a wind farm according to an aspect of the present disclosure includes the followings:

(1) a potential estimation unit that estimates a maximum amount of electrical power outputtable by each wind power generation device;

(2) a control amount determination unit that determines, based on the maximum amount of the electrical power estimated by the potential estimation unit, a control amount on an effective power of each wind power generation device and/or on a reactive power thereof in the wind farm; and (3) a control amount distribution unit that distributes the control amount to each wind power generation device based on an available power generation amount of each wind power generation device.

A control method and a control program that realizes the above-explained wind farm output control device are also embodiments of the present disclosure.

DETAILED DESCRIPTION

[1. First Embodiment]

(Structure)

Figure 1:
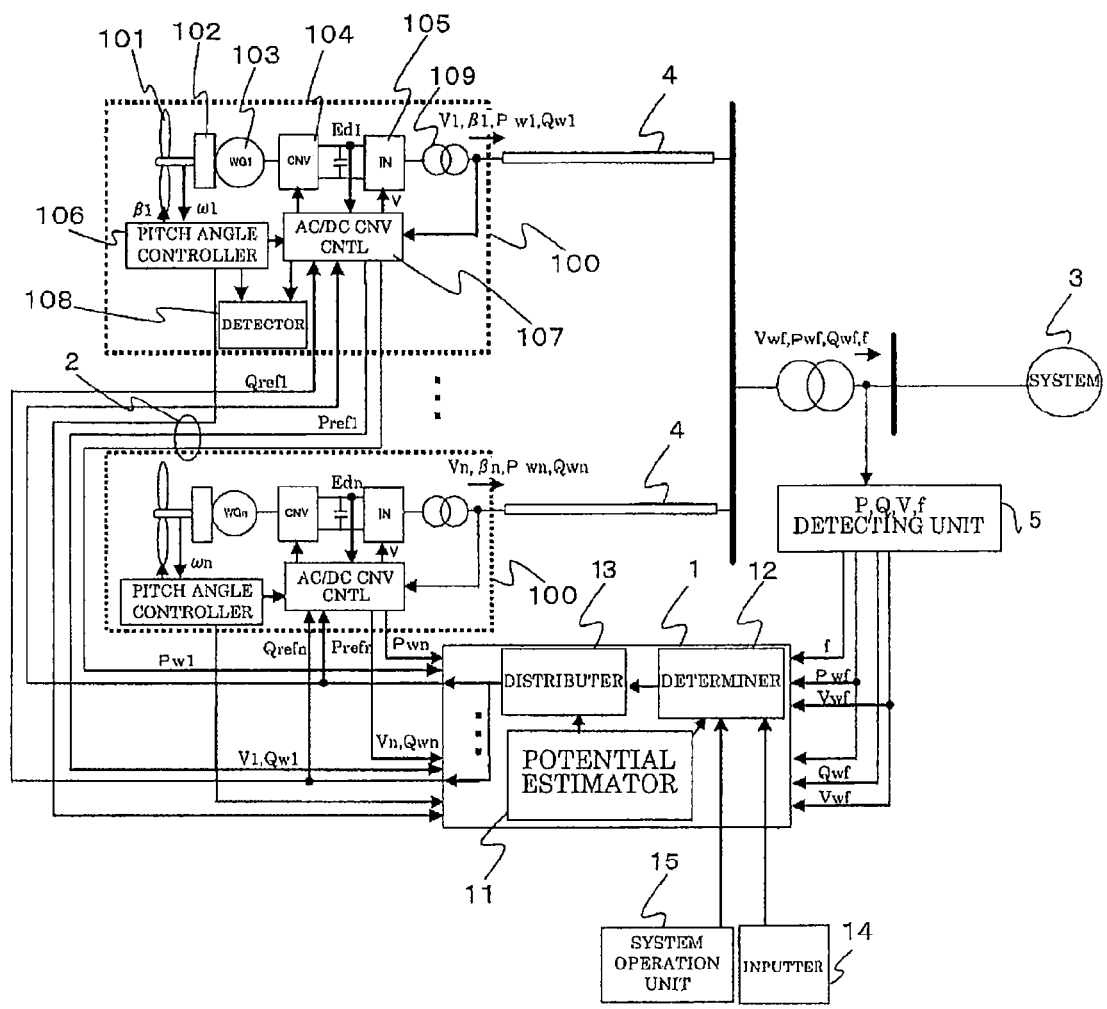
FIG. 1 is a block diagram illustrating a structure of an output control device for a wind farm according to a first embodiment of the present disclosure.

An explanation will be given of an output control device for a wind farm in detail according to a first embodiment of the present disclosure with reference to FIG. 1. FIG. 1 is a block diagram illustrating an output control device for a wind farm according to this embodiment.

The wind farm of this embodiment includes n number of wind power generation devices 100, an output control device 1 for the wind power generation devices 100, and an electric power system 3 that receives power output by each wind power generation device 100. The wind power generation devices 100 are connected to the output control device 1 via control lines 2, and the wind power generation device 100 controls the power generation amount in accordance with an instruction on a control amount from the output control device 1. Each wind power generation device 100 is connected to the system 3 via a power line 4. The power generated by the wind power generation device 100 is output to the system 3 through the power line 9. A supplied power data detecting unit 5 is provided at a connection point between the power line 4 and the system 3. The supplied power data detecting unit 5 detects supplied power data on various kinds of electric quantities supplied from the power line 4 to the system 3.

The wind power generation device 100 employs the following structures.

(1) Blades 101 having a variable pitch angle.

(2) A turbine 102 that is rotated by wind received by the blades 101.

(3) A power generator 103 that converts the rotation of the turbine 102 into AC power.

(4) A converter 104 that converts AC power having undergone conversion by the power generator 103 into DC power.

(5) An inverter 105 that converts DC power having undergone conversion by the converter 104 into AC power.

(6) A pitch angle controller 106 that controls the pitch angle of the blades 101.

(7) A DC/AC conversion controller 107 that controls the power conversion by the converter 104 and the inverter 105.

(8) A power-generation-device data detector 108 that detects effective power outputs Pw1 to Pwn, reactive power outputs Qw1 to Qwn, and pitch angle $\beta w1$ to $\beta wn$, and angular speed deviation $\Delta \omega 1$ to $\Delta \omega n$ in the wind power generation device 100.

(9) A booster transformer 109 provided at a connection point between the wind power generation device 100 and the power line 4.

The blades 101 employ a structure that makes the pitch angle of the blades 101 with respect to wind variable. The blades 101 are coupled with the turbine 102, and the turbine 102 converts the energy of wind received by the blades 101 into rotation energy. The rotation energy by the turbine 102 is transmitted to the power generator 103.

The power generator 103 generates AC currents based on the transmitted rotation energy. The generated AC currents are output to the converter 104. The converter 104 converts the input AC currents into DC power. The DC power is output to the inverter 105. The inverter 105 converts the input DC currents into AC currents with the same frequency as that of the commercial system.

The wind power generation device 100 is provided with the power-generation-device data detector 108 that detects the effective power output Pw1 to Pwn, the reactive power output Qw1 to Qwn, the pitch angle $\beta w1$ to $\beta wn$, and the angular speed deviation $\Delta \omega 1$ to $\Delta \omega n$ in the local wind power generation device 100. The power-generation-device data detector 108 is coupled with the pitch angle controller 106 that controls the pitch angle of the blades 101 as well as the power generator, and the AC/DC converter controller 107 that controls the power conversion by the converter 104 as well as the inverter 105. The power-generation-device data detector 108 detects the pitch angle $\beta w1$ to $\beta wn$ as well as the angular speed deviation $\Delta \omega 1$ to $\Delta \omega n$ from the pitch angle controller 106, and the effective power output Pw1 to Pwn as well as the reactive power output Qw1 to Qwn from the AC/DC converter controller 107.

The booster transformer 109 is provided at the output side of the inverter 105. The booster transformer 109 is provided at a connection point between the wind power generation device 100 and the power line 4, and boosts the voltage of the wind power generation device 100 to a voltage at the power-line-4 side. The power lines 4 in the wind farm are collected. A similar transformer is provided at a connection point between the collected power lines 4 and the system 3. A circuit breaker is provided at each connection point, and by an operation of the circuit breaker, the wind power generation devices 100 are capable of being electrically connected or disconnected to the power lines 4, and the power lines 4 are also be capable of being electrically connected or disconnected to the system 3.

The supplied power data detecting unit 5 that detects various electric amounts is provided at the connection point between the power lines 4 and the system 3. The supplied power data detecting unit 5 detects an effective power Pwf, a reactive power Qwf, a voltage Vwf, and a frequency f at the connection point. The supplied power data detecting unit 5 is coupled with the output control device 1, and transmits the detected effective power Pwf, reactive power Qwf, voltage Vwf, and frequency f to the output control device 1 of the wind farm.

The output control device 1 employs the following structures.

(1) A potential estimator 11 that calculates the potential of the whole wind firm.

(2) A control amount determiner 12 that determines, based on the maximum amount of electrical power of the wind farm estimated by the potential estimator 11, control amounts of the wind farm output with respect to an effective power, a spinning reserve to be maintained, a change rate to be constant, and/or a reactive power.

(3) A control amount distributor 13 that distributes the control amounts determined by the control amount determiner 12 based on the available power generation amount of each wind power generation device 100.

(4) An interface from an inputter 14 for allowing a user to input an effective power target value Pwf_ref to the control amount determiner.

(5) An interface from a system operation unit 15 for setting the effective power target value Pwf_ref to the control amount determiner 12.

The potential estimator 11 is coupled with the detector 108 of each wind power generation device 100, and the effective power output Pw1 to Pwn of each wind power generation device 100 and the pitch angle βw1 to βwn thereof are input to the potential estimator 11. The potential estimator 11 estimates a potential that is the maximum amount of the electrical power that each wind power generation device 100 can output based on the effective power output Pw1 to Pwn of each wind power generation device 100 and the pitch angle βw1 to βwn thereof. When the potential of each wind power generation device 100 in the wind farm is estimated and the total of the respective potentials is calculated, thereby estimating the potential of the whole wind farm.

The control amount determiner 12 is coupled with the detector 108 of each wind power generation device 100, the supplied power data detecting unit 5 provided at the connection point between the power lines 4 and the system 3, and the potential estimator 11. Input to this control amount determiner 12 are the effective power output Pw1 to Pwn, reactive power output Qw1 to Qwn, pitch angle βw1 to βwn, and angular speed deviation Δω1 to Δωn of the wind power generation device 100 from the detector 108, the effective power Pwf, reactive power Qwf, voltage Vwf, and frequency f of the connection point from the supplied power data detecting unit 5, and the potential from the potential estimator 11.

Figure 2:
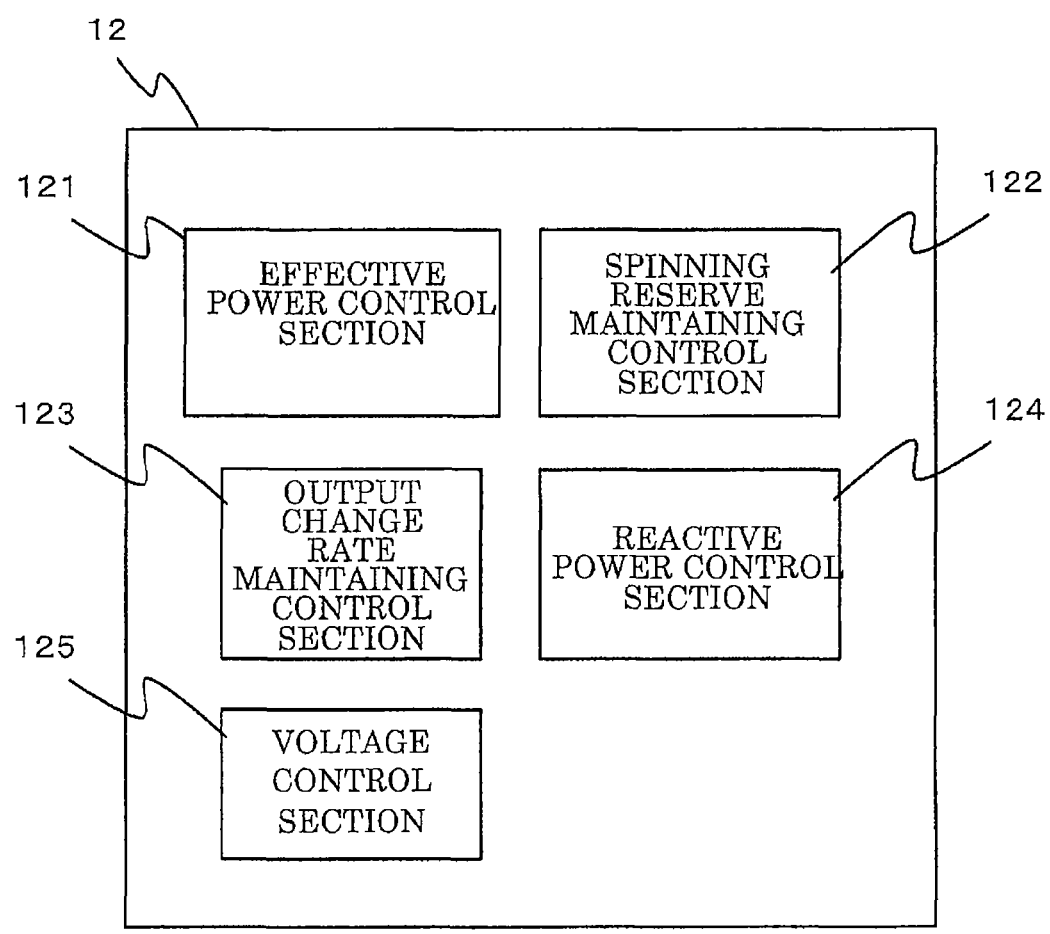
FIG. 2 is a block diagram illustrating a structure of a potential estimator according to the first embodiment of the present disclosure.

The control amount determiner 12 calculates a control amount for a wind farm output so as not to exceed the total potential outputtable by each wind power generation device 100. Example items to be controlled are an effective power target value Pwf_ref of a wind farm output, a spinning reserve target value Psr_ref of the wind farm output, a change rate target value DPT_ref of the wind farm output, a control amount target value Qwf_ref of the reactive power of the wind farm output, and a voltage control amount target value Vwf_ref of the wind farm output. Those values are not limited to preset values, and may be target values input from the inputter 14 coupled with the control amount determiner 12 and from the system operation unit 15. Hence, as illustrated in FIG. 2, the control amount determiner 12 includes an effective power control section 121, a spinning reserve maintaining control section 122, an output change rate maintaining control section 123, a reactive power control section 124, and a voltage control section 125.

(Operation)

Operations of the effective power control section 121, the spinning reserve maintaining control section 122, the output change rate maintaining control section 123, the reactive power control section 124, and the voltage control section 125 in the control amount determiner 12 will be explained in detail with reference to FIGS. 3 to 11.

(1) Effective Power Control of Wind Farm Output

The operation of the effective power control section 121 will be explained with reference to FIGS. 3 and 4. A target value of the effective power is input to the effective power control section 121 from the inputter 14 or the system operation unit 15. The effective power control section 121 sets this target value as the effective power target value Pwf_ref that is a target value of the wind farm output. The effective power target value Pwf_ref can be set based on a preset value, or a target value input from the inputter 14 or the system operation unit 15 (step 101).

Next, the effective power Pwf of the whole wind farm is detected. The effective power Pwf utilized at this stage is the effective power Pwf of the connection point detected by the supplied power data detecting unit 5 (step 102).

Moreover, an effective power control amount Pwf_r that follows the effective power target value Pwf_ref of the wind farm output is calculated with respect to a deviation between the effective power Pwf of the wind farm and the effective power target value Pwf_ref. The effective power control amount Pwf_r following the effective power target value Pwf_ref can be calculated based on a classic control theory. At this time, a limiter is provided so as to be within the minimum and maximum ranges of the wind farm effective power output set in advance. The effective power output maximum to be set is, for example, the potential obtained by the potential estimator (step 103).

Figure 3:
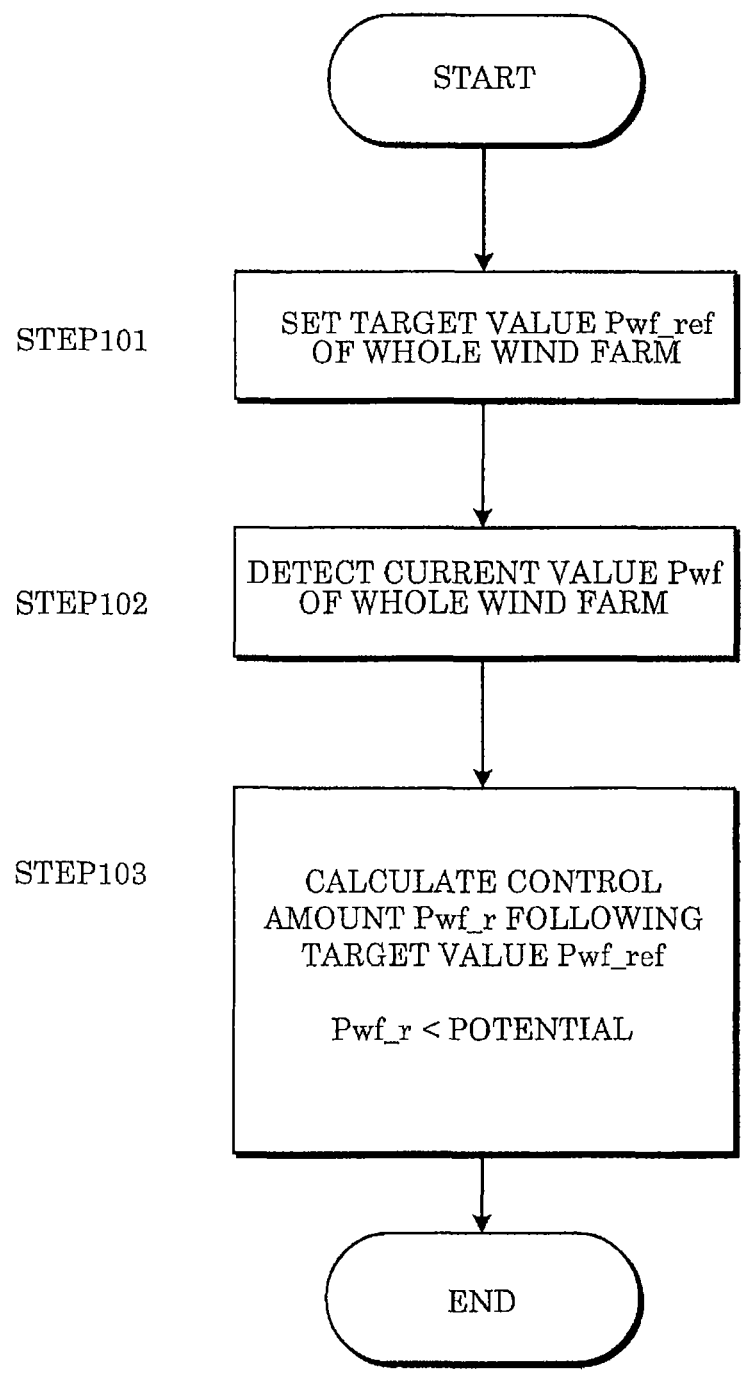
FIG. 3 is a flowchart illustrating a wind farm effective power control method according to the first embodiment of the present disclosure.
Figure 4:
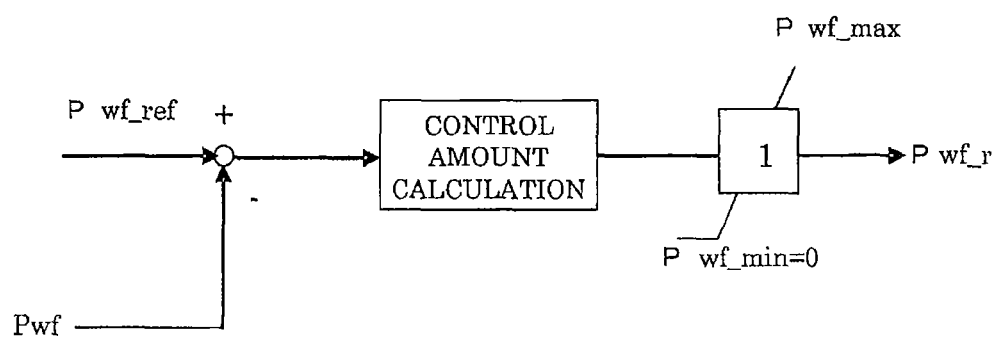
FIG. 4 is a block diagram illustrating the wind farm effective power control method according to the first embodiment of the present disclosure.

The effective power control amount Pwf_r is calculated from the effective power Pwf of the wind farm and the effective power target value Pwf_ref as is indicated by the procedures illustrated in FIG. 3 and FIG. 4.

(2) Control on Spinning Reserve Maintaining of Wind Farm Output

An explanation will be given of the operation of the spinning reserve maintaining control section 122 with reference to FIGS. 5 and 6. The spinning reserve maintaining control section 122 calculates the potential of each wind power generation device 100 in the wind farm, and calculates the total of the respective potentials, thereby calculating a potential Pwf_po of the whole wind farm (steps 201 and 202).

Next, a spinning reserve Psr_ref of the wind farm set in advance is subtracted from the potential Pwf_po of the whole wind farm, thereby calculating the effective power target value Pwf_ref (step 203). Subsequently, the effective power target value Pwf_ref is controlled so as not to exceed the preset minimum and maximum of the wind farm that are Pwf_limit_min and Pwf_limit_max (step 204).

Figure 5:
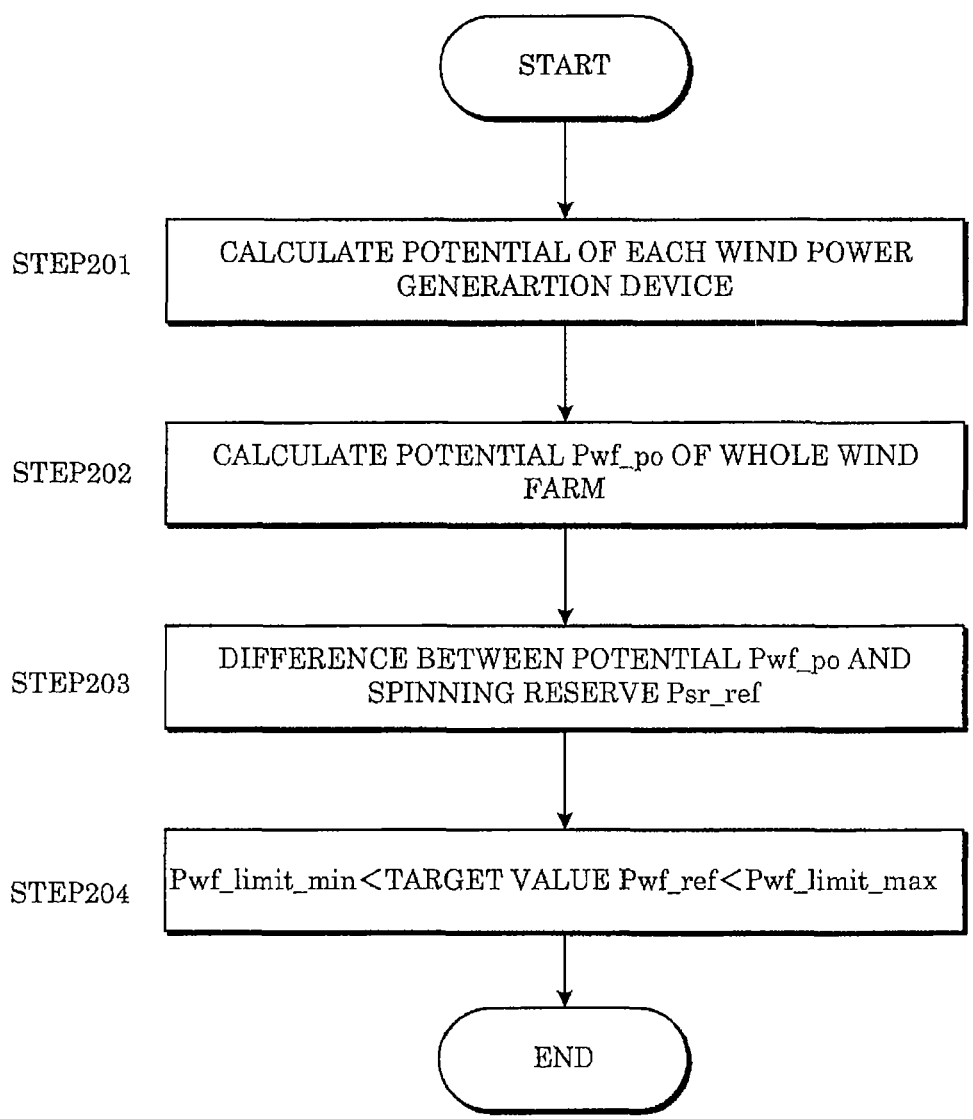
FIG. 5 is a flowchart illustrating a controlling method of maintaining the spinning reserve of the wind farm according to the first embodiment of the present disclosure.
Figure 6:
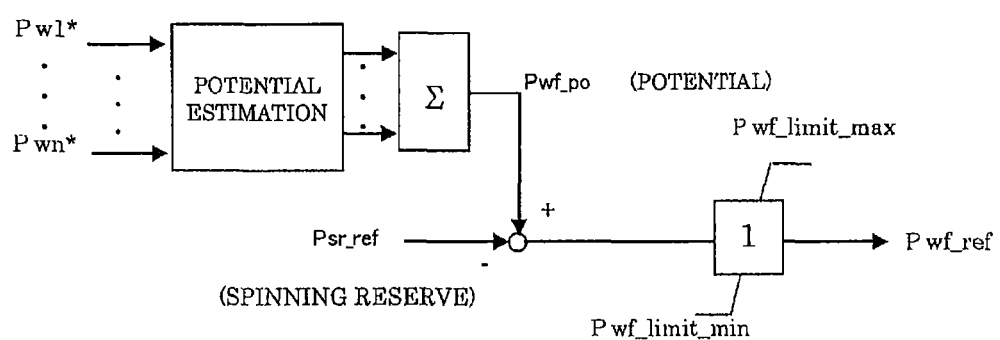
FIG. 6 is a block diagram illustrating the controlling method of maintaining the spinning reserve of the wind farm according to the first embodiment of the present disclosure.

The effective power target value Pwf_ref is calculated from the potential Pwf_po of the whole wind farm and the spinning reserve Psr_ref of the wind farm as is indicated by the above steps in FIG. 5 and FIG. 6.

(3) Control on Output Change Rate Maintaining of Wind Farm Output

An explanation will be given of the operation of the output change rate maintaining control section 123 with reference to FIGS. 7 and 8. The output change rate maintaining control section 123 sets the effective power target value Pwf_ref (step 301). The effective power target value Pwf_ref can be set based on a preset value or a target value input from the inputter 14 or the system operation unit 15.

Next, a change rate of the effective power target value Pwf_ref per a time Td is detected (step 302). The output change rate of the effective power target value Pwf_ref per a time Td is controlled so as not to exceed a preset range ±DPT_ref. The control amount is calculated with the effective power target value Pwf_ref maintaining the output change rate being as the target value of the effective power control (step 303).

Figure 7:
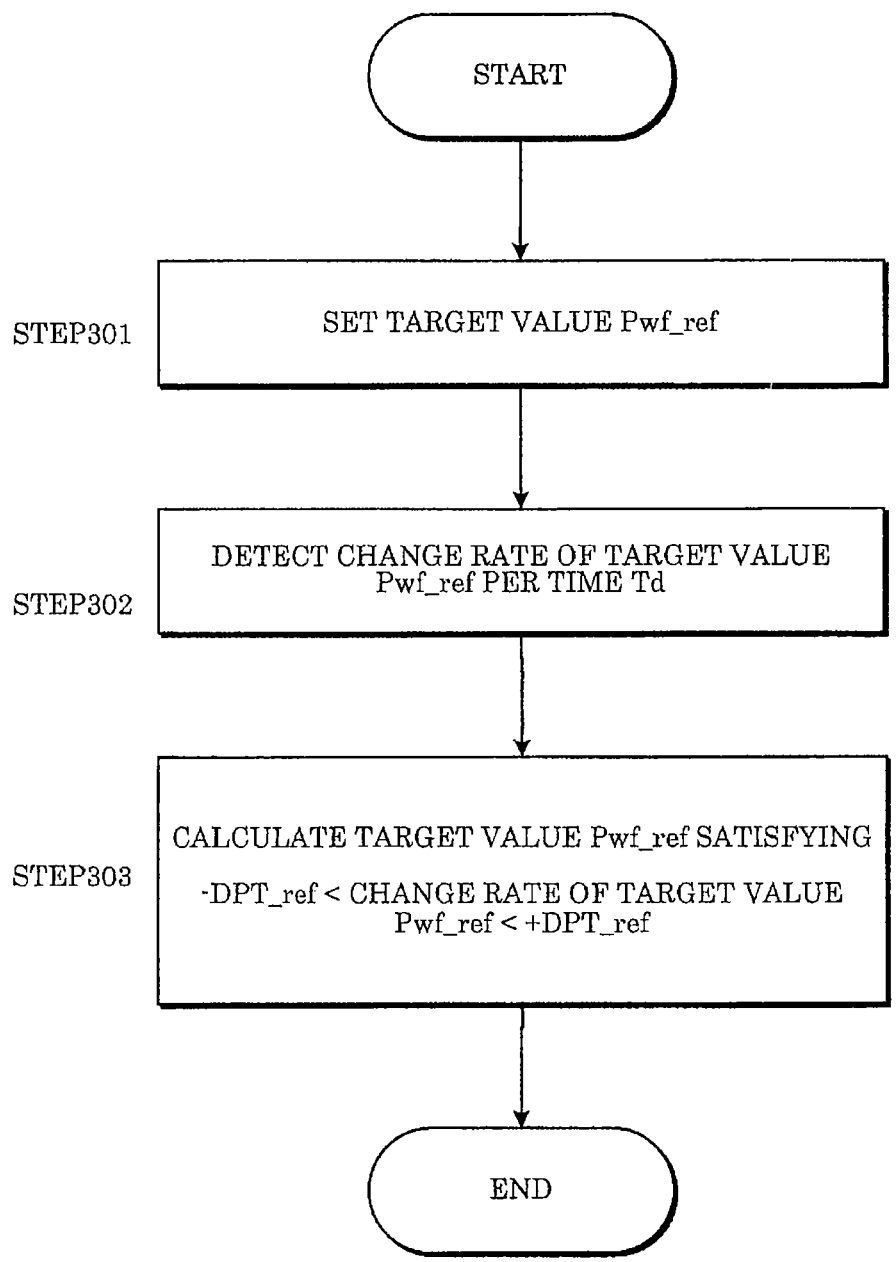
FIG. 7 is a flowchart illustrating the controlling method of maintaining the spinning reserve of the wind farm according to the first embodiment of the present disclosure.
Figure 8:
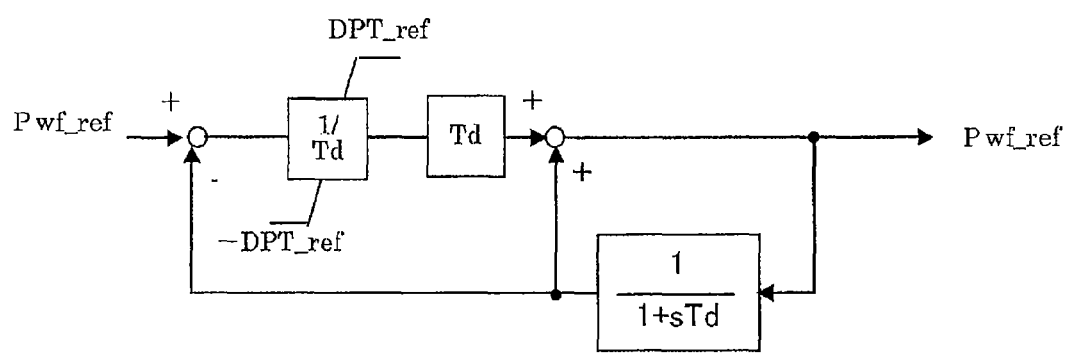
FIG. 8 is a block diagram illustrating the controlling method of maintaining the spinning reserve of the wind farm according to the first embodiment of the present disclosure.

As is indicated by the above steps in FIG. 7 and FIG. 8, the spinning reserve maintaining control by the spinning reserve hold control section 122 and the output change rate control by the output change rate maintaining control section 123 are made in a parallel manner, thereby performing a wind farm effective power control that maintains a spinning reserve and also an output change rate.

Figure 9:
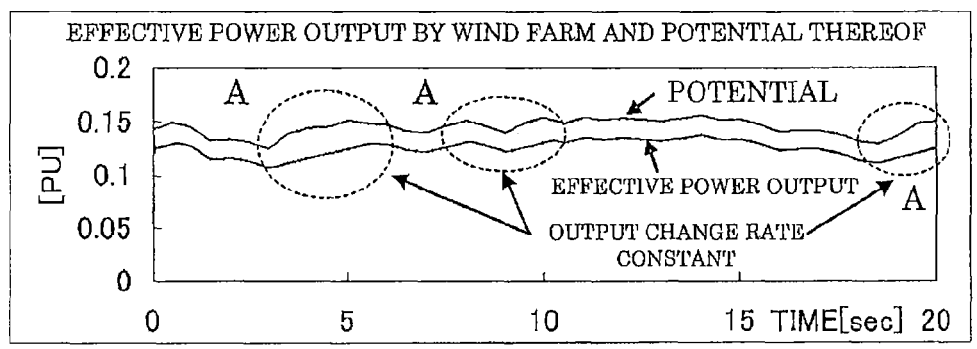
FIG. 9 is a graph illustrating a spinning reserve to be maintained and an output change rate to be constant through an output control of the wind farm according to the first embodiment of the present disclosure.

FIG. 9 illustrates example effective power of the wind farm and potential thereof having undergone a spinning reserve maintaining control and an output change rate control. In FIG. 9, the effective power target value Pwf_ref of the maintaining control output for a spinning reserve is set as a target value of the output change rate maintaining control, and a maintaining control output Pwf_ref* of the output change rate is set as a target value of the effective power control. As is indicated by effective power other than A in the figure, it can be seen that the effective power output transitions together with the transition of the potential. Conversely, as is indicated by A in the figure, when the change rate of the potential transition is large, the output change rate of the effective power output becomes constant. Hence, the absolute value of the slope of a graph representing the effective power output does not become equal to or greater than a certain value.

(4) Reactive Power Control of Wind Farm Output

Figure 10:
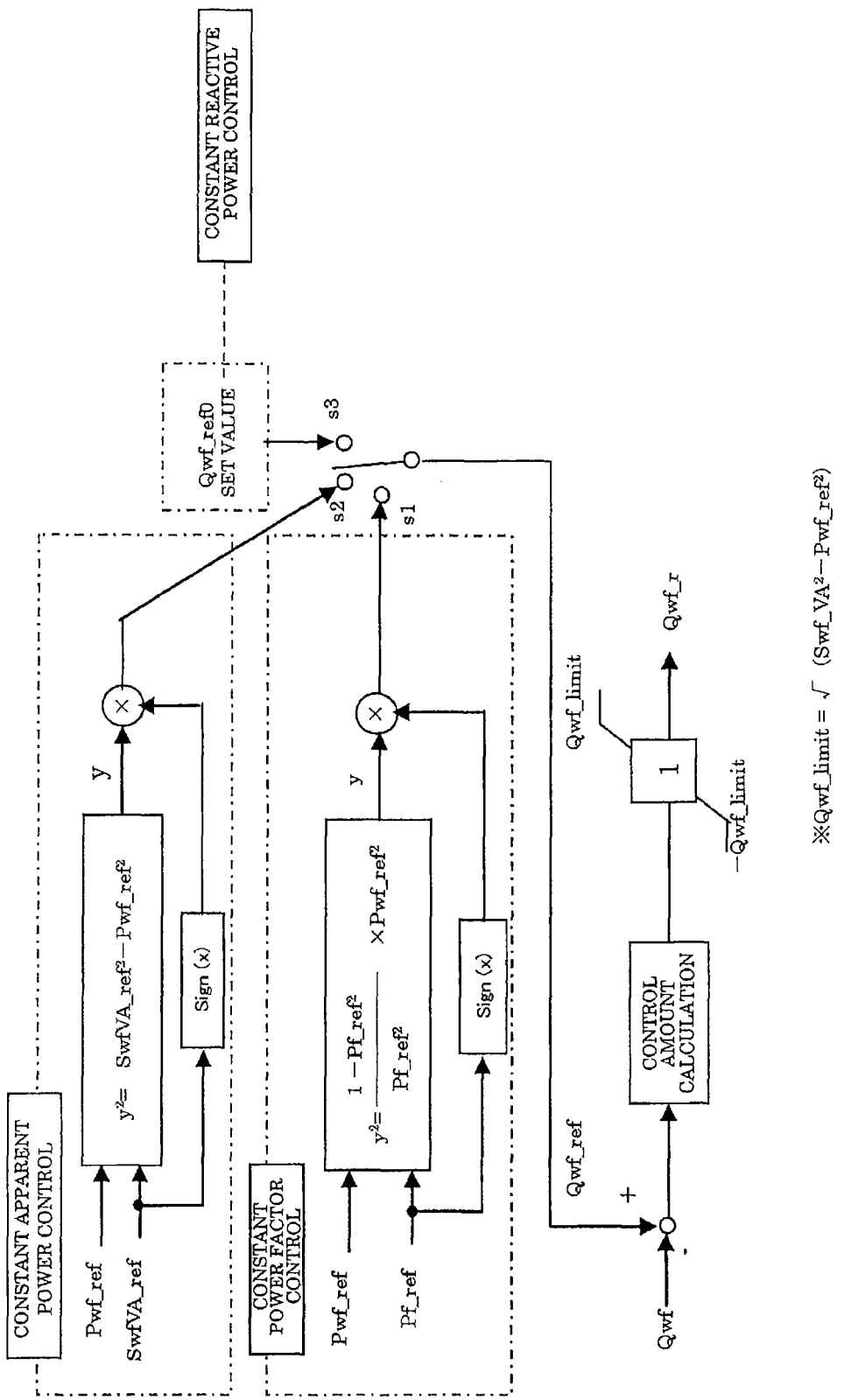
FIG. 10 is a block diagram illustrating a reactive power control method of the wind farm according to the first embodiment of the present disclosure.

The operation of the reactive power control section 124 will be explained with reference to FIG. 10. The reactive power control section 124 switches a control on the reactive power among a constant reactive power control, a constant apparent power control, and a constant power factor control. In any reactive power control, a limiter is provided so as to be within a preset minimum and maximum range ±Qwf_limit of the wind farm reactive power output. The minimum and maximum range ±Qwf_limit of the reactive power output is calculated from a rating Swf_VA of the wind power generation device and the effective power target value Pwf_ref. The effective power target value Pwf_ref is a smaller value than the value of the potential.

When, as the constant reactive power control, the reactive power control section 124 controls the reactive power within a certain value range, a PI control is performed on a deviation between a preset target value Qwf_ref0 and the reactive power detected value Qwf of the wind farm at the connection point. A limiter is also provided so as to be within the preset minimum and maximum range ±Qwf_limit of the wind farm reactive power output. The minimum and maximum of the reactive power output can be calculated based on the rating Swf_VA of the wind power generation device and the effective power target value Pwf_ref.

[Formula 1]

$$Qwf\_limit = \sqrt{(Swf\_VA^2 - Pwf\_ref^2)} \qquad (1)$$

When, as the constant apparent power control, the reactive power control section 124 controls the apparent power to be within a certain range, the reactive power target value Qwf_ref is calculated from the following formula (2) based on the effective power target value Pwf_ref and an apparent power target value SwfVA_ref, and is set as the target value of the reactive power control, thereby calculating the reactive power control amount that decreases a deviation between the target value and the detected value.

[Formula 2]

$$Qwf\_ref = -\sqrt{(SwfVA\_ref^2 - Pwf\_ref^2)} \qquad (2)$$

When, as a constant power factor control, the reactive power control section 124 controls the power factor to be within a certain range, the reactive power target value Qwf_ref is calculated from the following formula (3) based on the effective power target value Pwf_ref and a power factor target value Pf_ref, is set as the target value of the reactive power control, thereby calculating the reactive power control amount that decreases a deviation between the target value and the detected value.

[Formula 3]

$$Qwf\_ref = -\sqrt{\left(\frac{1 - Pf\_ref^2}{Pf\_ref^2} \times Pwf\_ref^2\right)} \qquad (3)$$

As explained above, in the constant apparent power control by the reactive power control section 124, in order to ensure the lifetime of devices like a transformer, the reactive power is adjusted in accordance with a change in the effective power so as to be make the apparent power constant. Moreover, in the constant reactive power control, in order to suppress a voltage rise and to maintain the power quality, a reactive power constant control is performed within the constraint of the transformer capacity. Furthermore, in the constant power factor control, in order to improve the power factor at the power system side, the reactive power is adjusted so as to make the power factor constant in accordance with a change in the effective power.

(5) Voltage Control of Wind Farm Output

Figure 11:
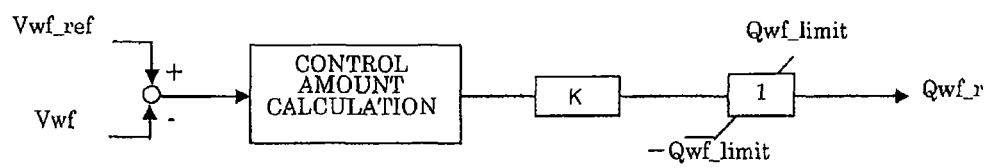
FIG. 11 is a block diagram illustrating a voltage control method of the wind farm according to the first embodiment of the present disclosure.

The operation of the voltage control section 125 will be explained with reference to FIG. 11. In this example, an explanation will be given of a voltage control method based on reactive power. The voltage control section 125 performs a PI control so as to reduce a deviation between the wind farm voltage target value Vwf_ref at the connection point and a detected value Vwf.

A target value of the voltage is input in the voltage control section 125 from the inputter 14 or the system operation unit 15. The voltage control section 125 sets this target value as a target value Vwf_ref of a wind farm voltage that is a target value of a wind farm output. The target value Vwf_ref of the wind farm voltage can be set based on a preset value or a target value input from the inputter 14 or the system operation unit 15. Moreover, a reactive power control amount Qwf_r that follows the target value Vwf_ref of the wind farm voltage is calculated with respect to a deviation between a detected value Vwf of the wind farm voltage and the target value Vwf_ref of the wind farm voltage. The reactive power control amount Qwf_r following the target value Vwf_ref of the wind farm voltage can be calculated based on a classic control theory like a PI control with a deviation between the detected value Vwf of the wind farm voltage and the target value Vwf_ref of the wind farm voltage multiplied by K times being as a input. Note that K is a gain for converting the voltage into reactive power.

At this time, a limiter is provided so as to be within the preset minimum and maximum range ±Qwf_limit of the wind farm reactive power output.

(6) Operation of Control Amount Distributer 13

Figure 12:
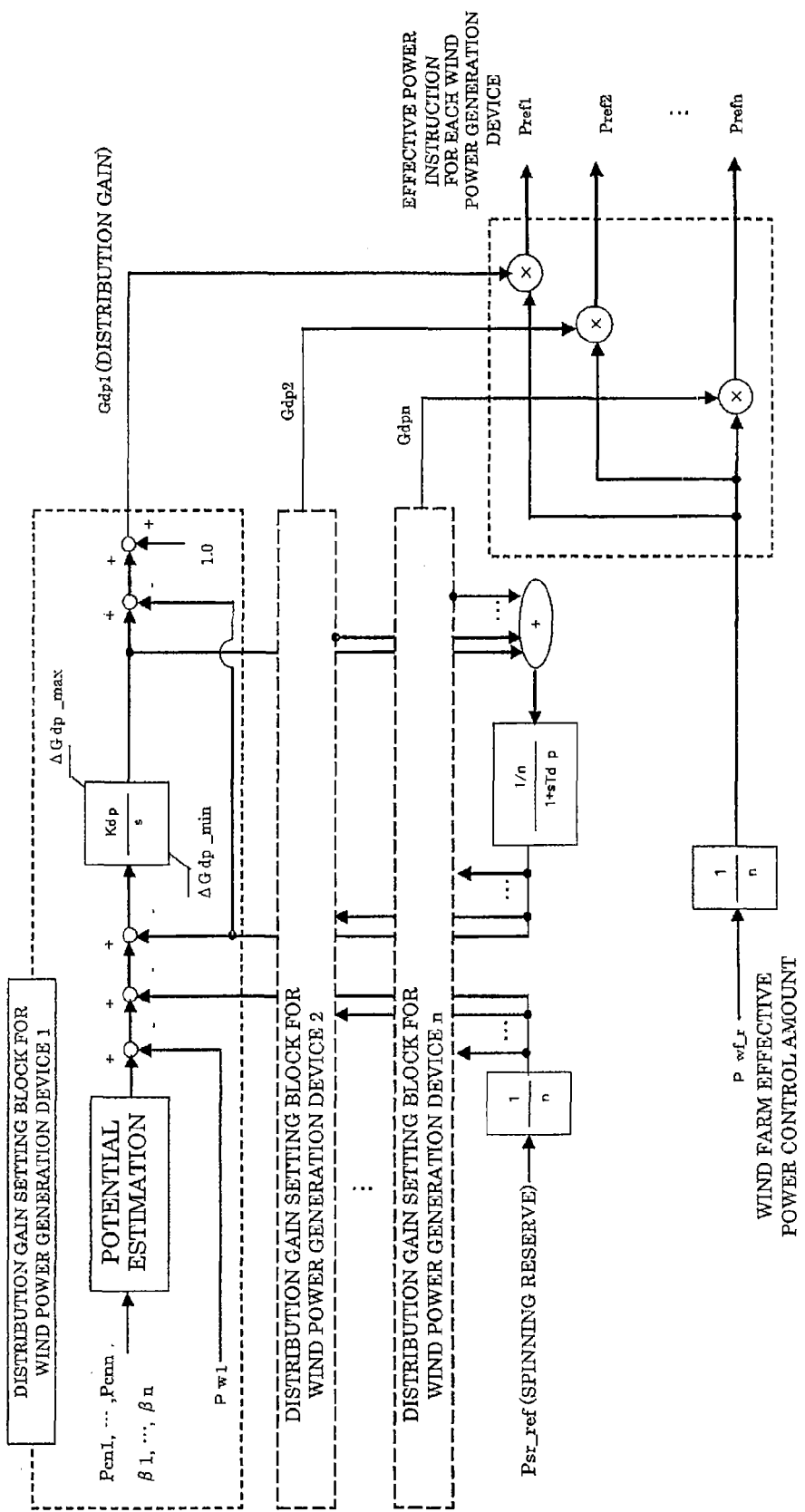
FIG. 12 is a block diagram illustrating a process for distributing an effective power output control amount of the wind farm to respective wind power generation devices according to the first embodiment of the present disclosure.

An explanation will be given of the operation of the control amount distributor 13 in this embodiment with reference to FIG. 12. The control amount distributor 13 sets a distribution gain for distributing the effective power control amount set by the control amount determiner 12 to each wind power generation device 100. The distribution gain is set based on the available power generation amount of each wind power generation device 100. The control amount determiner 12 adjusts the control amount target value for each wind power generation device 100 based on the set distribution gain, and outputs such a control amount target value to each wind power generation device 100 via the control line 2. Each wind power generation device 100 generates power based on the control amount target value.

The distribution procedures by the control amount distributor 13 are as follows.

A difference between the potential of each wind power generation device 100 obtained upon estimation from the detected value (Pinv1, to Pinvn, β1 to βn, and, Δω1 to Δωn) by the power-generation-device data detector 108 of each wind power generation device 100 and the effective power detected value (Pw1 to Pwn) of each wind power generation device 100 is obtained. This embodiment is a case in which a spinning reserve is also in consideration, and the energy of wind is released by a pitch angle control, and thus a spinning reserve is further subtracted.

Among the wind power generation devices 100, with respect to the wind power generation devices 100 having larger difference, the control amount distributor 13 transmits an instruction to increase the effective power output. This output is based on a preset accelerator gain Kdp. The total of distribution gains (Gdp1+Gdp2+ . . . +Gdpn) is controlled so as to be n. Note that n is the number of wind power generation devices. Tdp is a control cycle, and ΔGdp_min and ΔGdp_max are upper and lower constraints of the distribution gain. Note that Kdp is a coefficient that adjusts the amount of distribution. The maximum distribution gain ΔGdp_max and the minimum distribution gain ΔGdp_min are set in such a way that a distribution gain to be given to each wind power generation device 100 does not become equal to or greater than a certain value, or become equal to or smaller than a certain value.

More specifically, the following processes are performed.

(1) An output by each wind power generation device 100 is subtracted from the maximum capable output of the wind power generation device 100, and a spinning reserve is further subtracted, and, the available output power amount of each wind power generation device 100 is obtained.

(2) All integrals of the available power amount of the respective wind power generation devices 100 per a control cycle are summed up and then divided by the number n of the wind power generation devices 100 in the wind farm thereby obtaining the result. This result is subtracted from the available power generation amount of each wind power generation device 100, thereby increasing the distribution gain of the wind power generation device 100 with a larger available power generation amount.

(3) The result of the above step (2) is added to the result of (1) to obtain a distribution gain. At this time, the total of the distribution gains is the total number n of the wind power generation devices 100.

(4) When a constraint is set to be ΔGdp_max and ΔGdp_min, in order to allow the distribution gain to be n, the result of step (2) is subtracted from the result of the step (2) prior to the step (3) at which the result of the step (1) is added.

The control amount distributor 13 sets the control target value of each wind power generation device 100 based on the set distribution gain and the control amount set by the control amount determiner 12. Each wind power generation device 100 controls an output through the pitch angle controller 106 and the AC/DC converter controller 107 based on the distributed control amount. The pitch angle controller 106 changes the pitch angle of the blades of the wind power generation device 100 to release the energy of wind, thereby changing the effective power output. The AC/DC converter controller 107 once converts the power generation device output into DC through a converter, and controls the effective power output and the reactive power output through an inverter.

(Advantages)

According to this embodiment employing the above-explained structure and operation, the following advantages can be accomplished.

(1) According to this embodiment, the output amount of the wind farm is controlled within a range not exceeding power outputtable by each wind power generation device 100, and the control amount is distributed within a range where each wind power generation device 100 can output in accordance with the condition of wind case by case. Hence, the wind farm can be efficiently operated as a whole.

(2) Several advantages such as to suppress a fluctuation originating from wind, to perform a planned operation, and to contribute to the system frequency adjustment in response to an instruction from the system operation unit can be accomplished by allowing the wind farm effective power output to follow the target value.

(3) A contribution to the system frequency adjustment equivalent to those of water power generation devices and thermal power generation devices can be accomplished through the frequency control on the wind farm.

(4) The wind farm becomes able to control the effective power at a power receiving point in such away that the output change rate does not become larger than a preset value, and thus there are advantages such that the rotation speed of the wind power generation device does not exceed the upper limit and a rapid fluctuation is suppressed at the time of interconnection with the commercial system.

(5) The wind farm becomes able to control the effective power at the power receiving point in such a way that a spinning reserve is held and the output change rate does not become larger than a preset value. Accordingly, when a disturbance like a breakdown occurs in an interconnected commercial system, the supplied power data detector to the system can be increased, and thus the wind farm becomes able to contribute to a system stabilization.

(6) By causing the wind farm reactive power output to follow the target value, there are advantages such that the constant apparent power control ensures the lifetime of a device like a transformer, the constant reactive power control suppresses a voltage rise to maintain the power quality, and the constant power factor control improves the power factor at the system side.

(7) By maintaining the voltage at the wind farm interconnection point to be within a certain range within a capable maximum reactive power output, there is advantage such that the wind farm can supply power to the commercial system without an adverse effect of a voltage fluctuation originating from a change in wind.

[2. Second Embodiment]

An explanation will be given of a control device for a wind farm output in detail according to a second embodiment with reference to FIG. 13. The second embodiment changes the way of distributing the control amount by the control amount distributor 13 of the first embodiment. The same structural element as that of the first embodiment will be denoted by the same reference numeral, and the duplicated explanation thereof will be omitted.

Figure 13:
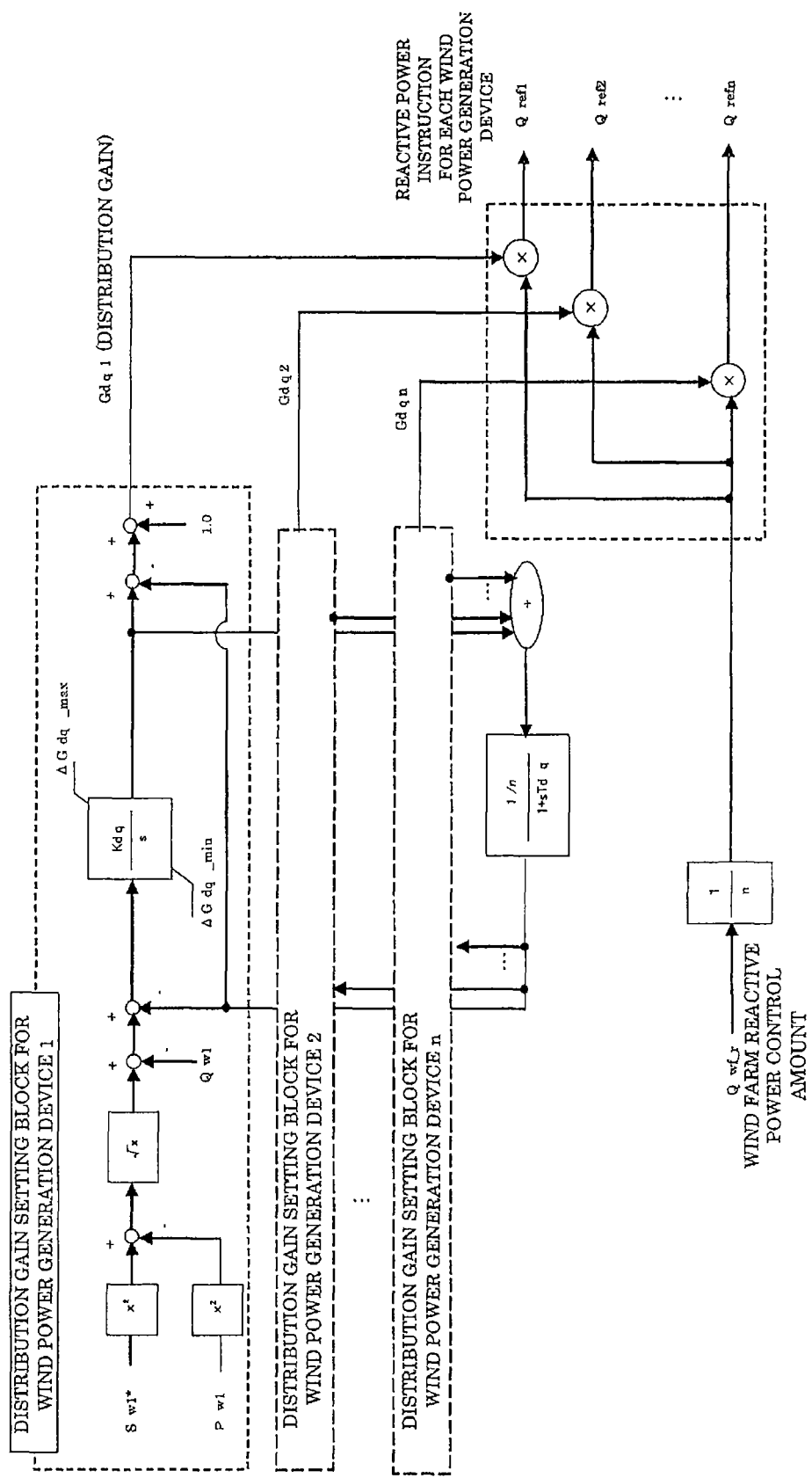
FIG. 13 is a block diagram illustrating a process for distributing a reactive power output control amount of the wind farm to respective wind power generation devices.

FIG. 13 is a block diagram illustrating a distribution method of a reactive power control amount. The control amount distributor 13 distributes, as the control amount of the reactive power at each wind power generation device 100, the control amount set by the control amount determiner 12 based on the available power generation amount of the power generator 103 of each wind power generation device 100. The distribution procedures by the control amount distributor 13 are as follows.

An outputtable reactive power is obtained from the rating (Sw1 to Swn) of each wind power generation device 100 and the effective power detected value (Pw1 to Pwn). The reactive power output instruction of the wind power generation device 100 with a large difference between the outputtable reactive power and the reactive power detected value (Qw1 to Qwn) is increased by a preset accelerator gain Kdq. The total of distribution gains (Gdq1+Gdq2+ . . . +Gdqn) is controlled so as to be n. Note that Tdq is a control cycle, and ΔGdq_min and ΔGdq_max are the lower and upper restraints of the distribution gain. Moreover, Kdq is a coefficient for adjusting the amount of distribution like Kdp. ΔGdq_max is the maximum value of the distribution gain, while ΔGdq_min is the minimum value of the distribution gain. The distribution gain given to each wind power generation device 100 is set so as to be between ΔGdq_min and ΔGdq_max.

More specifically, the following processes are performed.

(1) An outputtable reactive power is obtained from the rating of the wind power generation device 100 and the effective power detected value. For each wind power generation device 100, the reactive power is subtracted from the effective power detected value.

(2) All integrals of the reactive powers of the respective wind power generation devices 100 for each control cycle is summed up and then divided by the number of wind power generation devices 100 thereby obtaining the result. This result is subtracted from the reactive power of each wind power generation device 100, thereby increasing the distribution gain of the wind power generation device 100 with a smaller reactive power.

(3) The result of the step (2) is added to (1) to obtain the distribution gain. The total of distribution gains becomes the total number n of the wind power generation devices 100.

(4) When restraints to ΔGdq_max and ΔGdq_min are made, in order to cause the distribution gain to be n, the result of the step (2) is subtracted from the result of step (2) prior to the step (3) at which the result (1) is added.

According to this embodiment, it becomes possible to cause the wind farm reactive power output to follow the target value efficiently within a range where each wind power generation device 100 is outputtable in accordance with the condition of wind case by case. Hence, the advantages of the reactive power control and the voltage control, such as to suppress a voltage rise, maintain the power quality, and improve the power factor, can be enhanced.

[3. Third Embodiment]

Next, an explanation will be given of a control device for a wind farm output according to a third embodiment of the present disclosure with reference to FIG. 14. This embodiment is a modification of the way of estimation by the potential estimator 11 of the first embodiment. The same structural element as those of the first and second embodiments will be denoted by the same reference, and the duplicated explanation thereof will be omitted.

Figure 14:
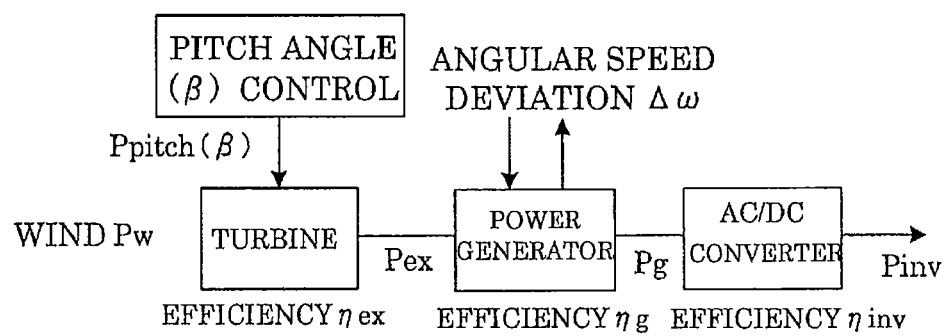
FIG. 14 is an explanatory diagram for an estimating method of a maximum amount of electrical power that can be output by each wind power generation device according to a third embodiment of the present disclosure.

FIG. 14 is an example process by the potential estimator 11. A ratio of power Pex taken out by the turbine from power Pv of the wind is defined as a turbine loss ilex, and power released by a pitch angle control is defined as Ppitch(β). The function β of Ppitch can be expressed as the following formula (4).

[Formula 4]

$$Pex=Pv(1-Ppitch(\beta))\eta ex \quad (4)$$

In this case, when $(1-Pitch(\beta))\eta ex$ is $\eta ex'(\beta)$, it can be expressed as the following formula (5).

[Formula 5]

$$Pex=Pv \cdot \eta ex'(\beta) \quad (5)$$

When it is presumed that a ratio between the turbine output Pex and a generation device output Pg is a generation device loss ηg, the rotation speed of the power generation device changes in accordance with a turbine output change, and this rotation torque is $Pt(\Delta\omega)$.

$$Pg=Pex(1-Pt(\Delta\omega))\eta g \quad (6)$$

In this case, when $(1-Pt(\Delta\omega))\eta g$ is $\eta g'(\Delta\omega)$, the following formula is satisfied.

$$Pg=Pex \cdot \eta'(\Delta\omega) \quad (7)$$

It is presumed that a generation device output is Pg and a loss of an AC/DC converter output Pinv in the converter 104 is ηinv. In this case, when the DC voltage of the converter 104 is maintained at constant, the following formula can be satisfied.

[Formula 8]

$$Pinv=Pg \cdot \eta inv \quad (8)$$

Formulae (4), (7), and (8) are multiplied.

[Formula 9]

$$Pex/Pv \times Pg/Pex \times Pinv/Pg = \eta ex'(\beta) \times \eta g'(\Delta\omega) \times \eta inv \quad (9)$$

Based on the formula (9), an outputtable potential by the wind power generation device can be expressed by the following formula (10).

[Formula 10]

$$Pv=Pinv/(\eta ex'(\beta) \times \eta g'(\Delta\omega) \times \eta cn) \quad (10)$$

A potential can be obtained based on the AC/DC converter output Pinv (i.e., equal to a wind power generation device output Pw) in the converter 104, and set values of ηex' (β), ηg' (Δω), ηinv, or actual values thereof. Note that ηex' is a function of the pitch angle, and ηg' is a function of an angular speed deviation.

(Advantages)

According to this embodiment, because it is difficult to precisely measure a wind speed at each wind power generation device 100, but the potential can be precisely estimated based on an output by the wind power generation device 100, the pitch angle, and a detected value of the angular speed deviation. This enables the wind farm to distribute the output without loss. In estimating the potential, an estimation can be performed by detecting a generation device output without using the AC/DC converter output Pinv and the loss ηinv.

[5. Other Embodiments]

The explanation was given of the multiple embodiments of the present disclosure in this specification, but those embodiments are merely examples, and are not intended to limit the scope and spirit of the present disclosure. More specifically, simultaneous distribution of the control amount of the distribution amount of the effective power and the control amount of the reactive power at the control amount distributor is also within the scope and spirit of the present disclosure. In this case, a control is performed in such a way that the potential=the control amount of the effective power+ the control amount of the reactive power. Moreover, the control may be performed in such a way that the potential=the control amount of the effective power+the control amount of (the reactive power+the spinning reserve). Such an embodiment can accomplish the advantages of both first and second embodiments.

In the first embodiment, the explanation was given of the control method by the effective power control section 121, the spinning reserve maintaining control section 122, the output change rate maintaining control section 123, the reactive power control section 124, and the voltage control section 125, but a control on the effective power, the spinning reserve, the reactive power, and the voltage through other schemes are also within the scope and spirit of the present disclosure. The same is true of the method of maintaining the output change rate.

While certain embodiments have been described, these embodiments have been presented by way of example only, and are not intended to limit the scope of the inventions. Indeed, the novel methods and apparatuses described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An output control device for a wind farm provided with a plurality of wind power generation devices, the control device comprising:
    a potential estimation unit that estimates a maximum amount of electrical power outputtable by each wind power generation device;
    a control amount determination unit that determines, based on a value calculated by subtracting a spinning reserve of the wind farm from the maximum amount of the electrical power estimated by the potential estimation unit, a control amount on an effective power of each wind power generation device and/or on a reactive power thereof in the wind farm; and
    a control amount distribution unit that distributes the control amount to each wind power generation device based on an available power generation amount of each wind power generation device.

2. The output control device for the wind farm according to claim 1, wherein:
    the wind power generation device comprises:
        a blade that has a variable pitch angle;
        a turbine that is rotated by wind received by the blade; and
        a power generator that converts a rotation of the turbine into AC power, and
    the potential estimation unit estimates an outputtable maximum amount of electrical power by each wind power generation device based on a pitch angle of the blade, an angular speed deviation of the power generator, and a conversion loss of the wind power generation device.

3. The output control device for the wind farm according to claim 2, wherein:
    the wind power generation device further comprises a converter that converts AC power generated by the power generator into DC power, and
    the conversion loss includes a turbine loss based on a power released through a pitch angle control, a generation device loss based on an angular speed deviation of the power generator, and a conversion loss of the converter.

4. The output control device for the wind farm according to claim 1, wherein the control amount determination unit determines the control amount on the effective power based on the maximum amount of the electrical power estimated by the potential estimation unit.

5. The output control device for the wind farm according to claim 1, wherein:
    the control amount distribution unit comprises a distribution gain determination unit,
    the distribution gain determination unit calculates an available power generation amount of each wind power gene n device for each control cycle, and determines a distribution gain of each wind power generation device such that
    the control amount determination unit increases the distribution gain of the wind power generation device with a larger available power generation amount such that a total of the distribution gains equals to a total number of the wind power generation devices that is n.

6. The output control device for the wind farm according to claim 1, wherein the control amount detemination unit the control amount on the reactive power is determined based on a preset reactive power target value, a reactive power target value on the basis of an effective power target value and an apparent power target value, or a reactive power target value on the basis of the effective power target value and a power factor target value.

7. A output control method for a wind farm provided with a plurality of wind power generation devices, the method comprising, using a computer to perform the steps of:
    estimating a maximum amount of the electrical power outputtable by each wind power generation device;
    determining, based on a value calculated by subtracting a spinning reserve of the wind farm from the estimated maximum amount of the electrical power, a control amount on an effective power of each wind power generation device and/or on a reactive power thereof in the wind farm; and
    distributing the control amount to each wind power generation device based on an available power generation amount of each wind power generation device.

8. The output control method for the wind farm according to claim 7, wherein:
    the wind power generation device comprises:
        a blade that has a variable pitch angle;
        a turbine that is rotated by wind received by the blade; and
        a power generator that converts a rotation of the turbine into AC power, and
    the method comprises: estimating a wind speed received by each wind power generation device based on a pitch angle of the blade, an angular speed deviation of the power generator, and a conversion loss of the wind power generation device.

9. A non-transitory computer readable medium storing an output control program for a wind farm comprising an output control device that controls respective outputs of a plurality of wind power generation devices, the program allowing a controller of the output control device to execute steps of:
   estimating a maximum amount of the electrical power outputtable by each wind power generation device;
   determining, based on a value calculated by subtracting a spinning reserve of the wind farm from the estimated maximum amount of the electrical power, a control amount on an effective power of each wind power generation device and/or on a reactive power thereof in the wind farm; and
   distributing the control amount to each wind power generation device based on an available power generation amount each wind power generation device.

* * * * *